Oct. 30, 1951 W. W. GARSTANG 2,573,257

COMBINED RADIO AND INTERCOMMUNICATING SET

Filed Feb. 24, 1947 2 SHEETS—SHEET 1

INVENTOR.

BY William W. Garstang

W. P. Hahn

ATTORNEY

Oct. 30, 1951 W. W. GARSTANG 2,573,257

COMBINED RADIO AND INTERCOMMUNICATING SET

Filed Feb. 24, 1947 2 SHEETS—SHEET 2

INVENTOR.
William W. Garstang
BY
W. P. Hahn
ATTORNEY

Patented Oct. 30, 1951

2,573,257

UNITED STATES PATENT OFFICE 2,573,257

COMBINED RADIO AND INTERCOMMUNICATING SET

William W. Garstang, Indianapolis, Ind., assignor, by mesne assignments, to Cornell-Dubilier Electric Corporation, South Plainfield, N. J., a corporation of Delaware Application February 24, 1947, Serial No. 730,479

5 Claims. (Cl. 250—20)

The present invention relates to improvements in radio receiving sets, and has for one of its objects that of providing means whereby the radio receiving set may form a part of an intercommunicating system.

A further object of the invention is to provide a system in which a radio receiving set may, without interfering with the normal operation of the receiving set for radio reception, provide at least one station of an intercommunicating system.

A further object of the invention is that of providing a system wherein a radio receiving set may provide at least one station of an intercommunicating system, in which system means are provided whereby when the or any of the "slave" stations is placed in communication with the "master" station comprised in the radio receiving set, the radio reception will be shut off in event the radio receiving set is acting as a radio receiver.

A further object of the invention is to provide means whereby the radio receiving set may be used as a "master" station for selective communication with one or more "slave" stations.

Further objects and advantages of the invention will appear more fully hereinafter in the appended specification and claims.

Figure 1:
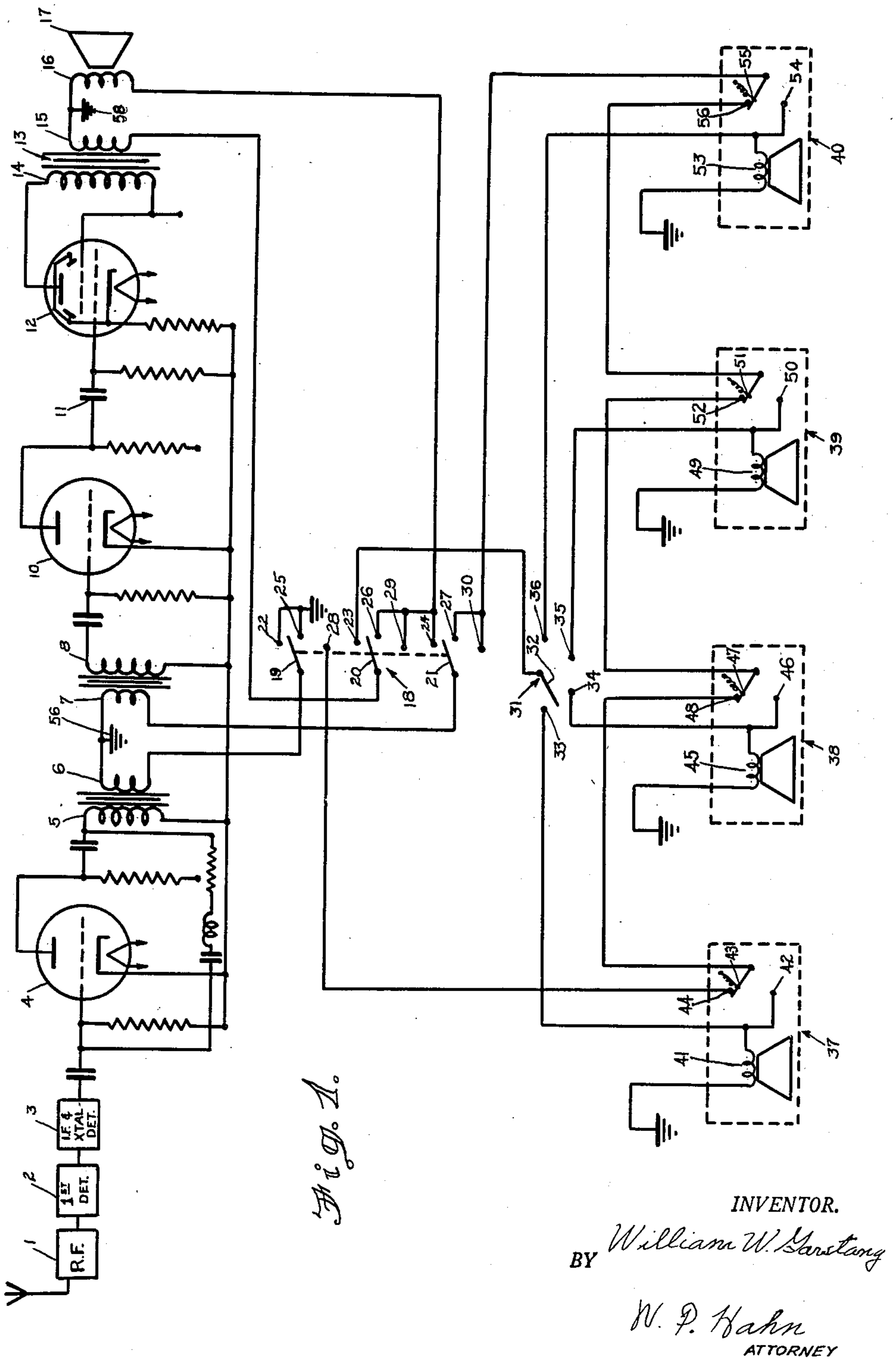
Figure 2:
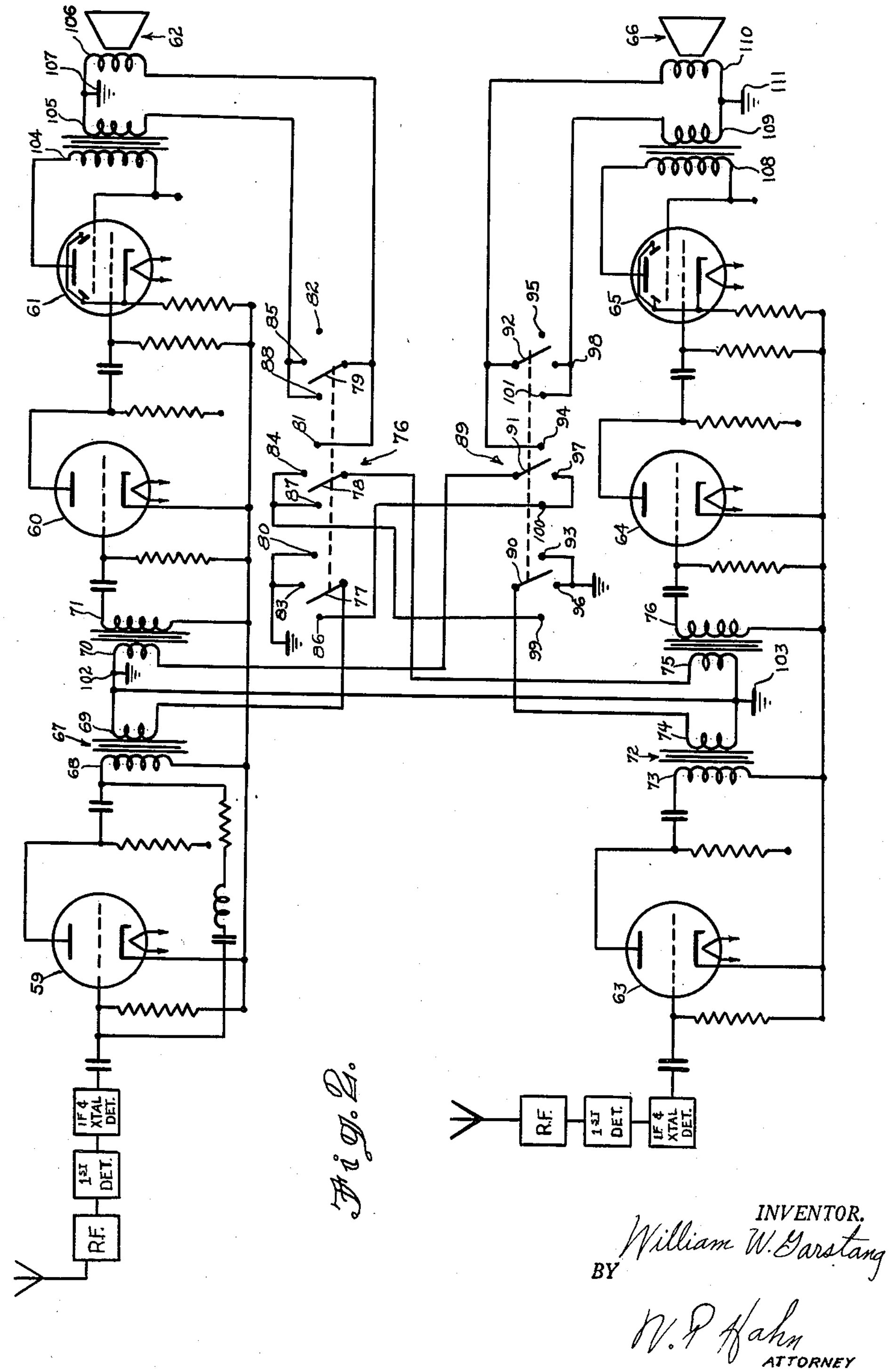

For the purpose of disclosing the invention, I have illustrated an embodiment thereof in the accompanying drawings, in which:

Fig. 1 is a diagrammatic view of a circuit disclosing one embodiment of the invention; and Fig. 2 is a diagrammatic view of a circuit disclosing a modification of the embodiment shown in Fig. 1.

Referring first to the system illustrated in Fig. 1, I provide a radio receiving set including an RF circuit 1, the first detector circuit 2 and an intermediate frequency crystal detector 3. These circuits are illustrated purely diagrammatically, as they are of a standard commercial type and a detailed description thereof is not considered necessary at this period.

The intermediate frequency amplifier and crystal detector stage 3 is coupled with a first audio amplifier 4, which in turn is coupled to a step-down transformer, including the primary winding 5 and a secondary winding 6. The step-down transformer in turn is coupled to a step-up transformer, which transformer includes a primary 7 and a secondary 8. This step-up transformer is coupled to the input of an audio amplifier tube 10, the output of which is connected through a condenser 11 to the grid circuit of an output tube 12. The output tube 12 in turn is coupled through a step-down transformer 13, which is provided with a primary winding 14 and a secondary winding 15 to the coil 16 of the speaker 17 of the radio set.

Associated with the radio receiving set, above described, is a control switch 18 provided with three control switch arms 19, 20 and 21. These switch arms are mechanically connected so that the three switches will move in unison. The three switch arms may be moved from a first position, in which the respective arms 19, 20 and 21 engage contacts 22, 23 and 24. This position is the send position for the radio set, including the speaker 17. The arms 19, 20 and 21 may be moved to a receiving position, which is the second position, and in this position respectively engage contacts 25, 26 and 27. In this position, the radio receiving set, above described, is in a position to receive communication from any one of the "slave" intercommunicating sets. This switch 18 may also be moved to a third position, which may be designated as the radio position, and in this position the arms 19, 20 and 21 respectively engage contacts 28, 29 and 30. In addition to the above control switch, there is provided preferably in the radio set, a selector switch 31 through the medium of which any one of the hereinafter described "slave" stations may be selected for the purpose of communication with the radio receiving set. This selector switch includes a movable switch arm 32 adapted to be moved to any one of the selected contacts 33, 34, 35 or 36, this number of contacts being provided in the system illustrated to accommodate four "slave" stations.

As indicated, the system illustrated is adapted to accommodate four "slave" stations 37, 38, 39 and 40. The "slave" station 37 includes a speaker and a speaker coil 41 which is connected to a contact 42, adapted to be engaged by a switch arm 43. The opposite terminal of the speaker coil 41 is grounded. The switch arm 43 is normally in engagement with a contact 44.

Likewise, the station 38 is provided with a speaker coil 45, one terminal of which is grounded and the other terminal of which is connected to a contact 46 adapted for engagement by a switch arm 47, which arm also is normally in engagement with a contact 48.

Station 39 has its speaker coil 49 grounded, with one terminal connected to a contact 50 adapted to be engaged by the switch arm 51, which is also normally in engagement with the contact 52.

Station 40 has its speaker coil 53 grounded, as are the other speaker coils, and a terminal connected to contact 54 adapted to be engaged by the switch arm 55, which is normally in engagement with contact 56. The term "normally" is used with respect to switch arms 43, 47, 51 and 55 as describing the position these switch arms occupy, when the "slave" stations are in a condition of reception of signals from the radio set and in normal operation of the system. These switches are normally biased through spring or other means into receiving position.

One terminal of each of the two windings 6 and 7 is grounded, as at 56, and likewise one terminal of each of the two windings 15 and 16 is grounded as at 58. The opposite terminal of the secondary winding 6 is connected to switch arm 19, while the opposite terminal of the winding 7 is connected to the switch arm 21. The opposite terminal of the winding 15 is connected to the switch arm 20, while the opposite terminal of the winding 16 is connected to the contact 24, this terminal of the winding 16 being likewise connected to the contacts 29 and 26.

The contact 28 of the switch 18 is connected to contact 44 of the first "slave" station 37, while the contacts 27 and 30 of the switch 18 are connected to the switch arm 55 of the last "slave" station 40.

Contact arm 43 of the first "slave" station is connected to the contact 48 of the second station, while the contact arm 47 of the second "slave" station is connected to the contact 52 of the third "slave" station. Contact arm 51 of the third "slave" station is connected to contact 56 of the fourth "slave" station, while contacts 42, 46, 50 and 54 of the respective "slave" stations 37, 38, 39 and 40 are respectively connected to the contacts 33, 34, 35 and 36 of the selector switch 31.

By the arrangement of the step-down transformer, including the primary and secondary windings 5 and 6, the impedance of the first audio stage is stepped down to an impedance which is equivalent of the voice coils 41, 45, 49 and 53 of the stations 37, 38, 39 and 40.

For the purpose of illustration, we will assume that the switch arms 19, 20 and 21 are placed in radio reception position and that the radio is operating. Under these circumstances, one terminal of the winding 6 will be connected through the switch arm 19, contact 28, the switch arms 43, 47, 51 and 55, which are normally in the position indicated, and back to contact 30 of switch 18 through switch arm 21 to the terminal of the primary 7. At the same time, the terminal of the secondary 15 of the transformer 13 will be connected through a switch arm 20, contact 29 to the terminal of the speaker coil 16. Therefore, the radio circuit will be established and the radio will be in operable condition for radio reception.

We will assume now that it is the desire of "slave" station 37 to communicate with the operator of the radio. Under these circumstances, the operator of the "slave" station 37 will move the arm 43 into engagement with the contact 42. Therefore, a speaking circuit of the radio will be established from ground through the speaking coil 41 across switch arm 43, across switch arms 47, 51 and 55 to contact 30 and thence across switch arm 21 to the primary 7 and thence back to ground at 56. The radio speaker coil 16 will be energized from the speaking coil 41. The effect would be the same, in event that any one of the other switches 47, 51 or 55 is moved to a sending position.

If the operator of the radio merely desires to receive a message, he need not manipulate either switches 18 or 31. If, however, the operator of the radio wishes to communicate back with station 37, the switch 18 is operated to move the switch arms respectively in contact with contacts 22, 23 and 24 and at the same time, the operator will move switch arm 32 in engagement with contact 33. Therefore, as soon as the operator at station 37 has communicated and released his switch 43, or moved the same back to its normal or listening position, the winding 15 of the transformer 13 will be connected through switch arm 20 and switch arm 32 to the coil 41 of the speaker 37, which in turn is grounded, it being remembered that the opposite terminal of the coil 15 is likewise grounded. At the same time, the speaker coil 16 will be connected through switch arm 21 to the primary 7, and secondary 6 will be connected to ground through switch arm 19 and thus be rendered inoperative, so that the operator at the radio loud speaker may have return communication with the operator at the "slave" station 37.

If it be desired to place the radio in non-radio receiving condition and at the same time place the same in intercommunicating position, the radio operator would move the switch 18 to intermediate position, wherein the switch arms 19, 20 and 21 are in engagement with contacts 25, 26 and 27. Under these conditions, assuming that station 37 wished to communicate with the radio station, by closing switch arm 43 in engagement with the contact 42, the primary 7 would be connected in a circuit from ground to the speaker coil 41 across the switch 43, across switches 47, 51 and 55 to contact 27 and across switch arm 21 to the primary winding 7. At the same time, the terminal of the secondary 15 is connected across switch arm 20 to contact arm 26 and thence back to the terminal of winding 16 and the circuit including the tubes 10 and 12 will operate the speaker 17.

It is thus apparent that by the above construction, I have provided a system whereby a radio receiving set may provide one station of an intercommunicating set, in which the other stations may at any time, during the operation of the set for radio reception, interrupt the radio reception for the purpose of talking to the operator of the radio and the operator of the radio may then have return communication with the initiating station. At the same time, in event the radio is rendered inoperative for radio reception, communication may be made between the various stations of the intercommunicating set.

In the circuit shown in Fig. 2, I have illustrated a modification of a system illustrated in Fig. 1. In the modification, I have provided a second radio which may be used as a radio receiving set and which at the same time, may be used as one station of an intercommunicating set, the other station being provided with an audio circuit including the first amplifier tube 59, the second audio amplifier tube 60, the power output tube 61 and the speaker 62. Likewise, the second radio set includes a first amplifier tube 63, a second amplifier tube 64, a power output tube 65 and a speaker 66. Interposed between the first audio amplifier tube 59 and a second amplifier tube 60 of the first radio set is a step-down transformer 67 including the primary coil 68 coupled with the first audio amplifier tube 59, the secondary coil 69 coupled with the primary coil 70 of a step-up transformer with the secondary coil 71 coupled to the second audio amplifier tube 60. In the audio circuit of the second radio set, I interposed a step-down transformer 72, which includes a primary 73 coupled with the first audio amplifier 63, a secondary coil 74 coupled with the primary coil 75 of a step-up transformer with a secondary coil 76 coupled with the second audio amplifier 64.

For operating the system, in order that either or both of the radio sets may be used for radio reception, and if desired, as intercommunicating sets, I provide with the first radio, a switch 76 including the movable switch arms 77, 78 and 79 mechanically connected, so that they will operate in unison. These switch arms are movable to any one of three positions. In the first position, switch arms 77 and 78 will engage contacts 80 and 81 respectively, and switch arm 79 will engage the dead contact 82. In the second position, the arms 77, 78 and 79 will respectively engage contacts 83, 84 and 85, while in the third position, arms 77, 78 and 79 will engage contacts 86, 87 and 88 respectively.

The second radio is provided with a similar switch 89 having switch arms 90, 91 and 92 mechanically connected, so that they will be moved in unison and when the switch is in its first position, arms 90 and 91 will engage contacts 93 and 94 and arm 92 will engage the dead contact 95. In their second position, arms 90, 91 and 92 will engage contacts 96, 97 and 98 and in their third position, arms 90, 91 and 92 will respectively engage contacts 99, 100 and 101.

Terminals of the windings 69 and 70 and the windings 74 and 75 are connected together, these windings likewise being grounded respectively, as at 102 and 103. The opposite terminal of the winding 69 is connected with switch arm 77, while the ungrounded terminal of the winding 70 is connected with switch arm 91. The ungrounded terminal of the winding 74 is connected with switch arm 90, while the ungrounded terminal of winding 75 is connected with switch arm 78. Contact terminals 86, 100 and 97 are interconnected, as are likewise contacts 99, 87 and 84 interconnected.

The output of the power output tube 61 is coupled with the primary winding 104 of a transformer, one terminal of the secondary 105 of which is connected to contacts 85 and 88, the opposite terminal of this secondary being connected to the voice coil 106 of the speaker 62. The opposite terminal of this voice coil is connected to switch arm 79 and contact 81, the coils 105 and 106 being grounded at 107.

Likewise, the power output tube 65 of the second radio is connected to the primary winding 108 of a transformer, the secondary 109 of which is connected to the voice coil 110 of the speaker 66. The opposite terminal of this secondary 109 is connected to contacts 98 and 101, while a terminal of the winding 110 is connected to switch arm 92 and contact 94. These windings 109 and 110 are grounded as at 111.

In the operation of the embodiment illustrated in the circuit shown in Fig. 2, we will assume that the second radio is in the receiving position and it is desired that the operator of the first radio wishes to communicate with the operator of the second radio. With the second radio in the receiving position, switch arms 90, 91 and 92 will be respectively engaging contacts 99, 100 and 101 and with the first radio in sending position, switch arms 77, 78 and 79 will be respectively engaging contacts 80, 81 and 82. Accordingly, the speaker coil 106 will be connected to contact 81 across switch arms 78 through the primary 75 and thence by ground to the opposite side of coil 106. Therefore, the primary 75 will be energized and with the contact 95 engaging contact 101, the coils 109 and 110 will be energized and communication will be to the speaker 66, the coils 69 and 74 being grounded to ground out the radio reception. It is obvious that a reverse situation could be occasioned in event the first radio were in playing or receiving position and the second radio had its switch placed in sending position. When the switches 86 and 89 are in receiving position instead of radio position, the radio is cut out and the two devices become merely intercommunicating sets.

I claim as my invention:

1. A radio system comprising a radio receiving system, including a radio frequency source, an audio circuit having a first audio amplifier having its input side connected to said frequency source, a second audio amplifier, a first speaker having a speaker coil, a first transformer having its primary connected with the output side of said second audio amplifier and its secondary connected with said first speaker coil, a second transformer having its primary connected with the output side of said first audio amplifier, a third transformer having its secondary connected to the input side of said second audio amplifier, a plurality of secondary speakers each having a speaker coil and switching means operatively connected with each of said secondary speaker coils, each of said switching means in one position connecting the secondary of the second transformer with the primary of the third transformer and in its second position connecting its associated speaker coil with the primary of the third transformer.

2. A radio system comprising a radio receiving system, including a radio frequency source, a first audio amplifier connected to said radio frequency source, a first transformer having its primary winding connected to the output side of said first audio amplifier, a second audio amplifier, a second transformer having its secondary connected to the input side of said second audio amplifier, a third transformer having its primary connected to the output side of said second audio amplifier, a first speaker having its speaker coil connected to the secondary winding of said third transformer and means for connecting the secondary of said first transformer with the primary of said second transformer, including a switch having a switch arm connected with one terminal of the primary winding of said second transformer and a contact connected with a terminal of the secondary winding of the first transformer, a second speaker having a speaker coil and a second contact on said switch connected with said speaker coil, said switch arm when engaging said first contact connecting terminals of the secondary of the first transformer and of the primary of the second transformer and when engagement with the second contact connecting the terminal of the primary of the said second transformer with the speaker coil of said second speaker, the other terminal of said speaker coil being grounded and terminal of the primary of the second transformer being grounded.

3. A radio system comprising a radio frequency source, a first audio amplifier connected to said radio frequency source, a first transformer having its primary connected to the output side of said first audio amplifier, a second audio amplifier, a second transformer having its secondary connected to the input side of said second audio amplifier, a third transformer having its primary connected to the output side of said second audio amplifier, a first speaker having a speaker coil connected to the secondary of said third transformer, means for connecting the primary of said first transformer with the secondary of said second transformer including a first switch and a second switch, said first switch having a switch arm connected to one terminal of the primary of said second transformer and a contact connected to the switch arm of said second switch, said second switch having a contact connected to a contact of a third switch and a second contact connected to the speaker coil of a second speaker, said third switch having a contact arm connected to the terminal of the secondary of the first transformer, said first, second and third switches when in their first positions connecting a terminal of the secondary of the first transformer with a terminal of the primary of the second transformer, said first and second switches when in their second position connecting the primary of said second transformer with the speaker coil of said second speaker, said third switch when in its second position grounding a terminal of the primary of the first transformer.

4. A radio system comprising a radio receiving system, including a radio frequency source, an audio circuit having a first audio amplifier connected to said frequency source, a second audio amplifier, a first speaker having a speaker coil, a first transformer having its primary connected to the output side of said second audio amplifier and its secondary connected to the first speaker coil, a second transformer having its primary connected to the output side of the first audio amplifier, a third transformer having its secondary connected to the input side of said second audio amplifier, a second speaker having a speaker coil, a first switch having a switch arm connected to the primary of said third transformer, a first contact and a second contact, a second switch having a switch arm connected to the secondary of said second transformer and a contact connected to the secondary of said second transformer and a contact connected with said first contact of said first switch, the second contact of said first switch being connected to the speaker coil of said second speaker, the switch arm of said first switch when in engagement with the first contact thereof and said switch arm of the second switch when in engagement with its contact connecting a terminal of the primary of the third transformer with a terminal of the secondary of the second transformer and the switch arm of said first switch when in engagement with the second contact thereof connecting the coil of the second speaker with the primary of said third transformer and said second switch arm when moved out of engagement with this contact disconnecting the terminal of the secondary of the second transformer from the first contact of the first switch.

5. A radio system comprising a radio frequency source, a first audio amplifier connected to the output side of said frequency source, a first transformer having its primary connected to the output side of said first audio amplifier, a second audio amplifier, a second transformer having its secondary connected to the input side of said second audio amplifier, a third transformer having its primary connected to the output side of said second audio amplifier, a first speaker having a speaker coil, a second speaker having a speaker coil, a first and a second switch each having a first and a second position, said first switch in its first position connecting the secondary of said first transformer with the primary of said second transformer and said second switch when in its first position connecting the first speaker coil with the secondary of the third transformer, said first switch when in its second position connecting the second speaker coil with the primary of said second transformer, said second switch in its second position connecting the secondary of the third transformer with the second speaker coil and a third switch when closed, with the first and second switches in their second position, connecting said first speaker coil with the primary of the second transformer.

WILLIAM W. GARSTANG.

REFERENCES CITED

The following references are of record in the file of this patent:

UNITED STATES PATENTS

| Number | Name | Date |
|---|---|---|
| 1,812,624 | Cummings | June 30, 1931 |
| 2,054,933 | Frazier | Sept. 22, 1936 |
| 2,087,027 | Glaser | July 13, 1937 |
| 2,162,369 | Campbell | June 13, 1939 |
| 2,164,960 | Stockton | July 4, 1939 |
| 2,186,500 | Schnell | Jan. 9, 1940 |
| 2,239,772 | Beizer | Apr. 29, 1941 |
| 2,269,144 | Campbell | Jan. 6, 1942 |
| 2,275,406 | Berhley | Mar. 10, 1942 |
| 2,339,678 | Campbell | Jan. 18, 1944 |
| 2,433,413 | Withey | Dec. 30, 1947 |